United States Patent [19]

Johnson et al.

[11] 4,302,795

[45] Nov. 24, 1981

[54] TAMPER RESISTANT SNAP-FIT STROBE HOUSING

[75] Inventors: Bruce K. Johnson, Andover; David Van Allen, Malden, both of Mass.

[73] Assignee: Polaroid Corporation, Cambridge, Mass.

[21] Appl. No.: 81,188

[22] Filed: Nov. 19, 1979

[51] Int. Cl.³ .............................................. G03B 5/02
[52] U.S. Cl. ........................................ 362/16; 362/8; 362/374; 362/375
[58] Field of Search ...................... 362/16, 8, 374, 375

[56] References Cited

U.S. PATENT DOCUMENTS 3,763,366 10/1973 Bahnsen .............................. 362/16

*Primary Examiner*—Stephen J. Lechert, Jr.
*Attorney, Agent, or Firm*—Leslie J. Payne

[57] ABSTRACT

A snap-fit strobe housing, which resists manual disassembly, includes mating first and second housing sections with an interior surface of a wall of one section carrying a locking detent and a wall of the other section carrying a latching portion projecting in a manner and direction to engage the locking detent. Also included is structure extending from the locking wall in overlapping relationship to a surface of the latching portion facing away from that wall so as to engage and retain the latching portion in continuous engagement with the locking detent.

7 Claims, 6 Drawing Figures

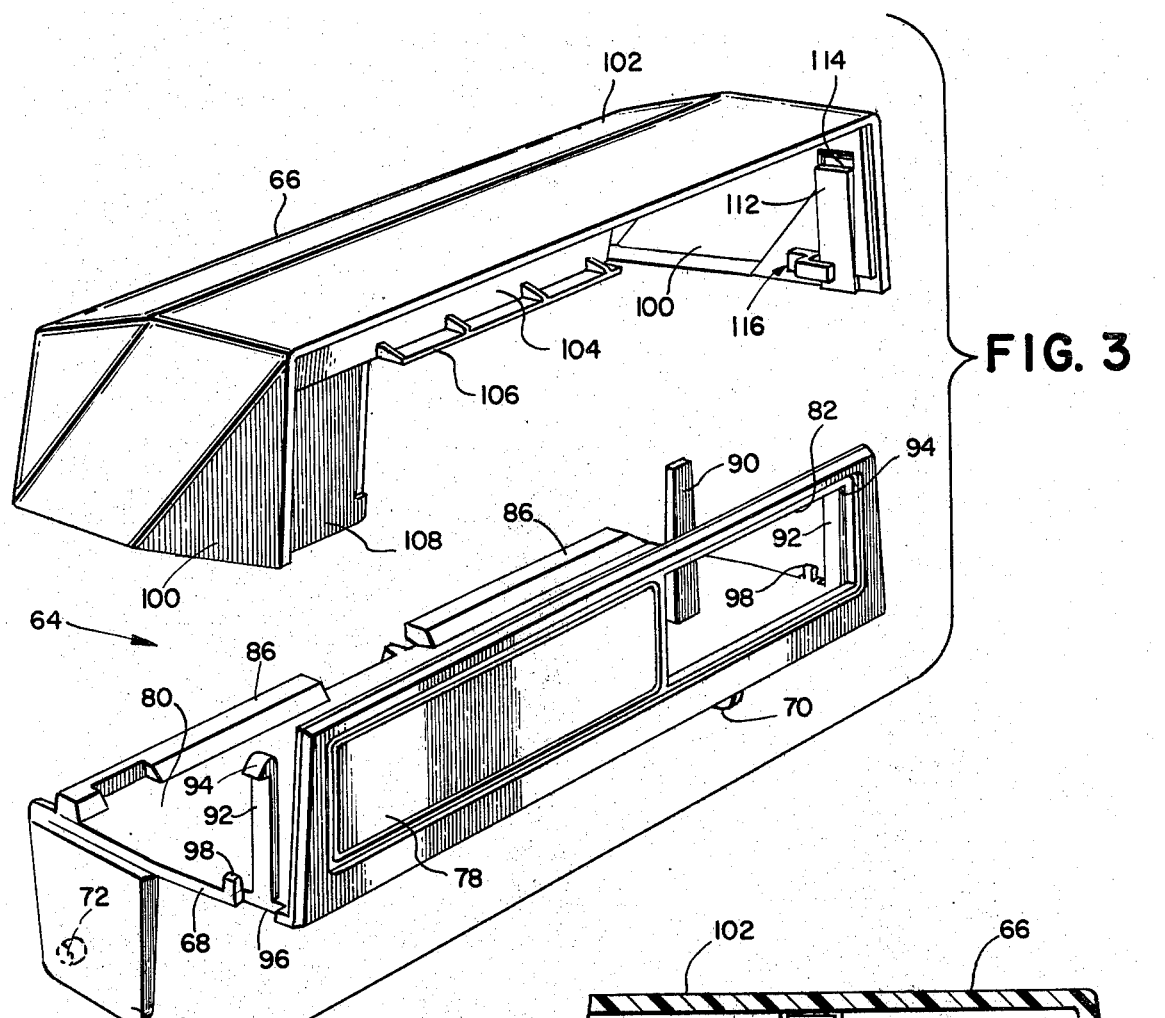

TAMPER RESISTANT SNAP-FIT STROBE HOUSING

BACKGROUND OF THE INVENTION

This invention relates generally to photographic apparatus and, more particularly, to an improved snap-together tamper resistant strobe housing.

In the photographic field, electrically fired strobe units for transient illumination of scenes to be photographed have gained wide acceptance. In use of such strobes, it is necessary to use relatively high amounts of electrical power for achieving the desired illumination intensities required for proper scene lighting. Accordingly, it becomes imperative for safety reasons to provide a housing which suitably electrically insulates the user. Contemporaneous with this requirement are the requirements that the strobe unit be susceptible of convenient manufacture and assembly so as to enable production in a commercially competitive manner.

In regard to the latter requirements, it is known to provide housing components which can be easily assembled together in a snap-fit manner. Exemplary types of snap-fit housings are described in the following U.S. Pat. Nos.: 3,346,210; 3,415,599; 3,617,013; 3,620,475; 3,712,557; 3,923,387; 4,015,790; 4,076,186; and 4,079,499. Generally, these housings are comprised of two flexible plastic members having components which are flexible, yet stiff enough to enable a secure snap-fit interengagement. While such housings serve in a reliable and satisfactory manner, potential exists that a user could effect disengagement of the snap-fit by merely laterally spreading or flexing the housing walls apart. Thus, although these housings facilitate easy assembly and can provide the necessary electrical insulation, there remains the possibility of a user relatively easily opening the housing, thereby exposing himself to the danger of electrical shock.

Attempts have been made to restrict or minimize disengagement of snap-fit members. One known approach is used in a snap together camera housing utilizing stop members on a first member cooperating with a flexible finger on a second member for restricting longitudinal reciprocation of the latching finger. While the foregoing approach is useful, it still suffers from the drawback that disengagement can be effected if the finger is moved laterally with respect to such longitudinal direction, as by a prying or flexing apart of the first and second members.

It will be appreciated, therefore, that conventional housings of the type noted suffer potential shortcomings. These shortcomings are, moreover, compounded by requirements that the housing and its locking components must be capable of mass production and manufacturing techniques as well as be within tolerance levels, incident to such techniques, for them to be acceptable in a competitive commercial market.

SUMMARY OF THE INVENTION

In accordance with the present invention, an improved housing is provided which is adapted for storing components forming a photographic flash unit and which resist unassisted manual opening.

As in prior art housings, there is provided a pair of mating first and second housing components for retaining electrical and electronic elements of a photographic flash unit. Formed on the interior of an exterior wall of the first housing is a first latching arrangement. Carried by the second housing is a second latching arrangement projecting therefrom in a manner and direction to engage the first latching arrangement when the housing components are mated to thereby prohibit separation of the housing components when these components are pulled in a given plane generally parallel to the plane of the wall.

In an illustrated embodiment, the present invention provides retaining means extending from said wall in overlapping relationship to a surface of the second latching arrangement facing away from said wall so as to engage and retain the first latching arrangement in continuous engagement with the second latching arrangement when said wall is pulled relative to the first housing component at an angle to the given plane.

In a preferred embodiment, the second latching arrangement is a finger having a portion at least adjacent the distal end thereof and made of a material sufficiently flexible to allow its limited movement between an initial unflexed and unlocking position to a flexed locking position. The first latching arrangement is constructed to flex the finger from the unlocking to the locking position for releasably retaining the flexible portion in the locking position. The retaining and engaging means includes a retaining member carried for movement with the exterior wall so as to engage the surface of the finger facing away from the interior of the wall and retain it in continuous engagement with the first latching arrangement when pulled at an angle to the given plane. Such retaining and engaging means can further include a retaining post on the first component engagable by a second retaining member extending from the interior of the exterior wall and movable with the exterior wall when pulled at an angle to the given plane.

In a preferred embodiment, one of the two housing components has an appropriately formed opening located adjacent the finger for allowing insertion of a suitable tool therethrough for flexing the flexible portion and thereby effecting release of the finger. Accordingly, the housing components are separable.

Among the other objects of the invention are, therefore, the provision of a housing having structure for continuously retaining disengageable locking means in engagement despite the disengageable locking means being pulled in a manner and direction otherwise effecting disengagement; the provision of an easily assemblable snap-fit housing having improved structure for inhibiting separation thereof; and the provision of an improved built-in photographic flash unit housing having structure for facilitating its snap-fit assembly while inhibiting its unassisted manual separation.

Other objects and further scope of applicability of the present invention will become apparent from the detailed description to follow when taken in conjunction with the accompanying drawing in which like parts are designated by like reference numerals.

BRIEF DESCRIPTION OF THE DRAWINGS

FIG. 3 is an exploded perspective of the flash housing components;

FIG. 4 is an enlarged fragmented cross-sectional view illustrating cooperation between the locking components of the housing components;

DETAILED DESCRIPTION

Figure 1:
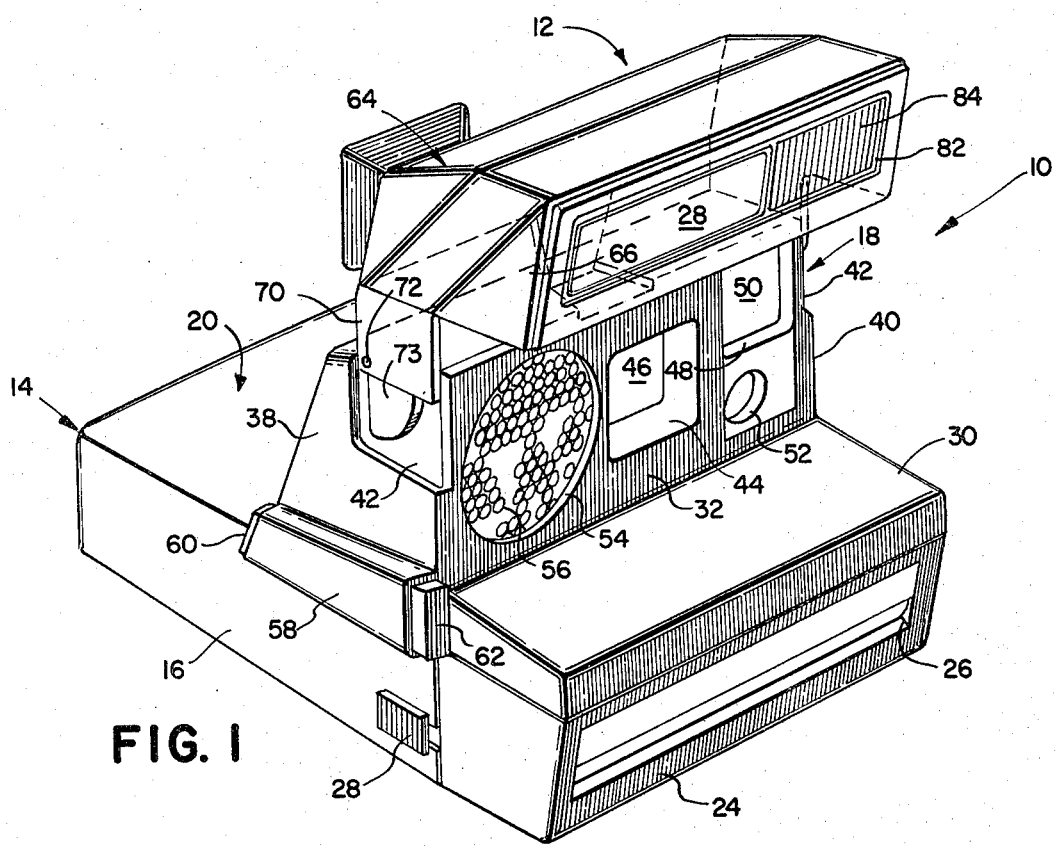
FIG. 1 is a perspective view of a camera having an electronic flash unit embodying the principles of this invention and shown in an extended condition.
Figure 2:
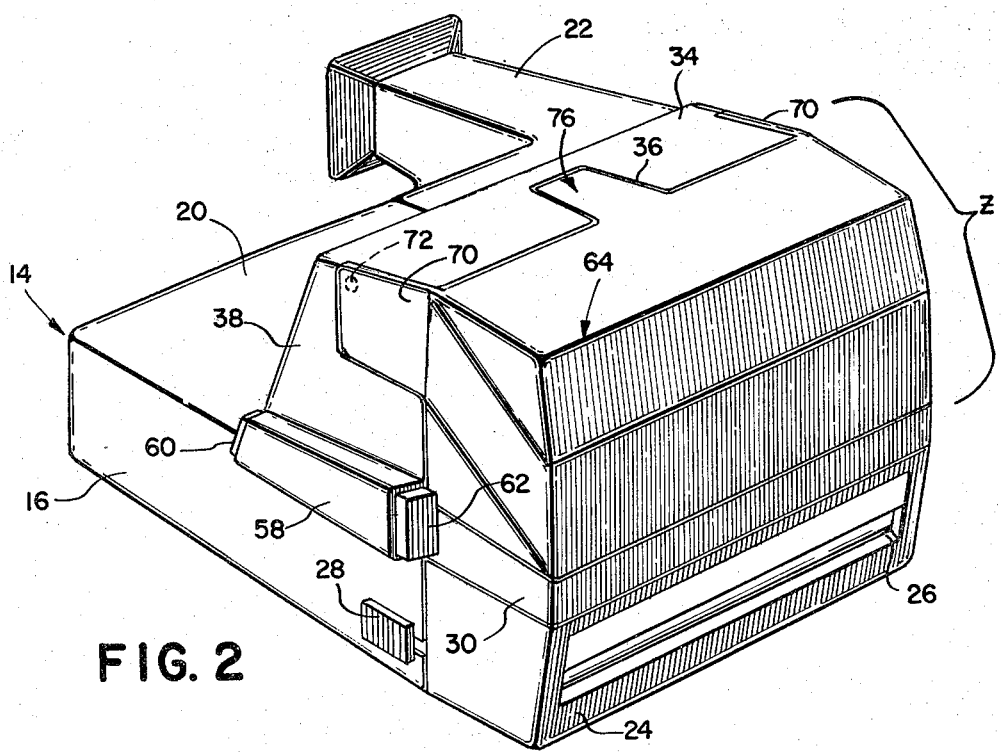
FIG. 2 is a perspective view similar to FIG. 1, but showing the flash unit in a folded condition.

With initial reference to FIGS. 1 and 2, there is shown a compact camera 10 having pivotally attached thereto a foldable flash unit 12 of the electronic strobe type. In the illustrated embodiment, the camera 10 is a compact, highly automated self-developing type utilizing a reflex or folded exposure optical path. Such flash unit 12 is movable between an operative erect position (FIG. 1) and an inoperative folded storage position (FIG. 2). For a more detailed description of the depicted camera 10 and flash unit 12, reference is made to copending application Ser. No. 54,598, filed July 3, 1979; which is assigned in common with the instant application.

In the erect position, the flash unit 12 is positioned for directing its light output into the camera's optical field of view. This provides supplemental transient illumination for facilitating exposure. In the inoperative or storage position, the flash unit 12 is arranged to nest over the forward portion of camera 10. Accordingly, a protective enclosure for the flash unit and the forward portion is provided.

With continued reference to FIGS. 1 and 2, there is shown a camera housing 14 having a generally parallelepiped base section 16. Upwardly extending from the base section 16 is a forwardly facing housing section 18. Many of the camera components associated with exposure control and processing operations are retained in the housing section 18. Behind the housing section 18 and located over the rearward portion of the base section 16 is a section 20 for defining an exposure (not shown). As best illustrated in FIG. 2, the housing section 20 also includes a rearwardly extending viewfinder lens tube 22. The exposure chamber receives a self-developing film pack (not shown) of the type holding a plurality of self-developing film units along with a flat battery for powering the camera's electrical system. A representative example of such a film pack is described generally in commonly assigned U.S. Pat. No. 3,877,045, issued on Apr. 8, 1975, to S. M. Bloom et al.

Pivotally coupled to the forward end of the base section 16 is a film loading door 24 which includes a pair of processing rollers (not shown). In use, the film loading door 24 is normally in the illustrated closed position. As so positioned, the pressure applying rollers are aligned with a film pack film exit slot and an elongated film exit slot 26 formed in a front wall of the loading door 24. This allows for advancement of each of the film units exteriorily of the camera 10. For effecting loading and unloading of the film pack from the exposure chamber, the film loading door 24 is pivoted downwardly to an open position (not shown). This is in part accomplished by movement of a slide latch button 28 from the position shown to an unlatching position (not shown). When in the open position, the film pack can be inserted in or removed from the film pack receiving chamber.

Extending forwardly of the housing section 18 is an apron housing 30 positioned over the film loading door 24. In use, the apron housing 30 protectively covers a plurality of internal camera components. For example, it protects a small electrical motor for driving the film processing rollers, a film unit advancing mechanism and, optionally, a film counter wheel (all of which are not shown).

With specific reference to FIGS. 1 and 2, the housing section 18 is defined, at least in part, by a lens mounting wall 32; a top wall surface 34 extending rearwardly from the upper edge of surface 32 and having a central depression 36 therein extending part way down the lens wall 32 for cooperating with the flash unit 12; and a pair of oppositely spaced side wall surfaces 38 and 40 joining the corresponding lateral edges of surfaces 32 and 34 and each having a recessed flash unit mounting section 42. Also provided in the housing section 18 is a centrally disposed aperture 44 for a variable focus objective or picture-taking lens 46. The taking lens 46 is mounted so that its optical axis is substantially normal to the surface of the lens wall 32. A viewfinder lens aperture 48, aligned with the viewfinder lens tube 22, provides a mounting frame for a Galilean-type viewfinder lens 50. Located below the lens aperture 48 is a photocell aperture 52 for providing optical access to an exposure control photocell (not shown). Also provided is a transducer aperture 54 for allowing access to an ultrasonic energy transducer 56; forming part of an automatic lens focusing system of the camera 10. Since such a focusing system, more fully described in commonly assigned U.S. Pat. No. 3,522,764, is considered optional, it may be eliminated without departing from the scope of the invention.

Enclosed by the exposure chamber defining section 20 is an inclined mirror (not shown) positioned in alignment with the taking lens 46. This mirror is for reflecting image forming light passing therethrough downwardly to the camera's focal plane; which is coincidental with the uppermost film unit in the film pack. It will be appreciated that the camera 10 includes a direct-viewing viewfinder system and uses a folded or reflex optical path for exposure. Other exposure control components forming part of the camera are located in the housing section 18. They include a shutter and exposure aperture defining mechanism, and various electronic circuit modules for controlling camera operation. For representative examples of these components and their arrangements, see commonly assigned U.S. Pat. Nos. 3,979,762; 4,040,072; and 4,052,728.

A longitudinal actuator mounting tube 58 is integrally formed on the side wall 38. The mounting tube 58 includes a push button type actuator switch 60, for connecting the flash unit 12 to the film pack battery so as to charge the flash unit's electrical storage capacitor. Thereafter, a slider actuator 62, opposite the actuator switch 60, is pushed. This initiates automatic camera operations including film exposure and subsequent film processing.

Referring back to the flash unit 12, it is an electronically-controlled strobe type for providing supplemental, artificial illumination in the camera's field of view for facilitating exposure. Since the structure and operacondition (FIGS. 4 and 5) wherein the latching portion 94 is in releasable engagement with a detent ridge 114 formed on the top of the camming surface 112. As so engaged, a user is prevented from vertically separating the housing compartments 66 and 68 by manually pulling them apart in a vertical direction which is generally parallel to the plane of the wall 100.

Figure 5:
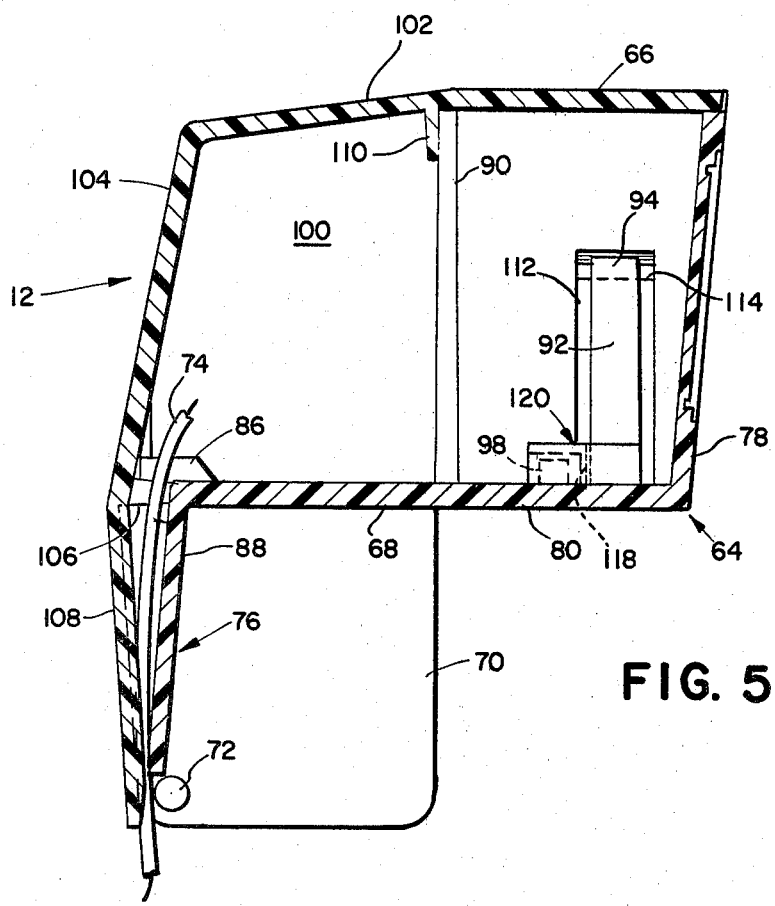
FIG. 5 is an enlarged fragmented cross-sectional view depicting in more detail the cooperation between the housing components in the locked assembled condition.
Figure 6:
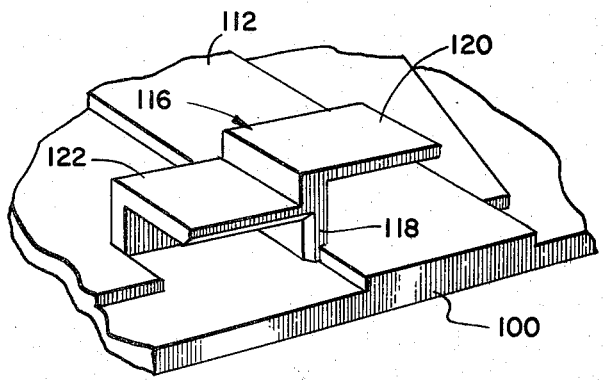
FIG. 6 is an enlarged perspective view of one of the locking structures formed on the side wall of one of the housing components.
Figure 7:
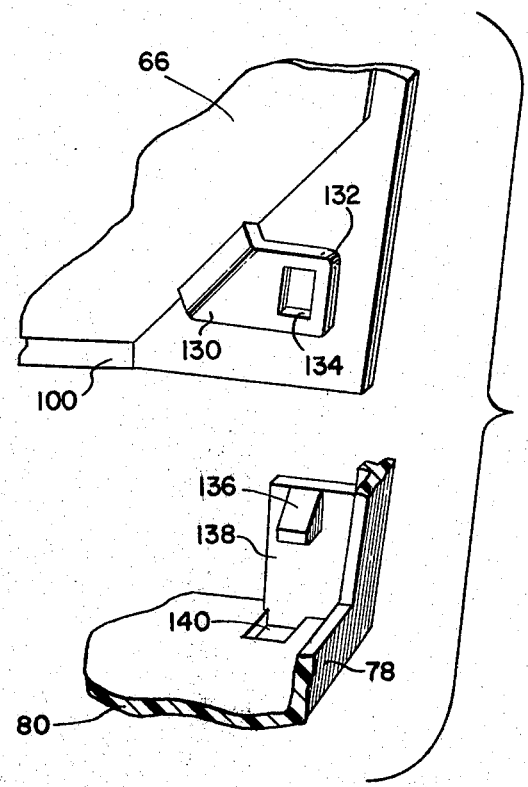
FIG. 7 is an exploded fragmented view illustrating details of another locking structure.

In accordance with the invention, to prevent sideways or lateral separation of each of the latching fingers 92 from the detent ridges 114 due to lateral flexing of the corresponding end wall 100, there is provided a pair of integral retaining members 116, only one of which is shown in FIGS. 3-6. Each of the retaining members 116 cooperate with the corresponding ones of the latching fingers 92 and the associated restraining posts 98. In this connection, each of the retaining members 116 has a stem 118 extending from the end wall 100 adjacent an edge of the camming surface 112 (FIGS. 3, 4 and 6). Projecting in opposite directions from the stem 118 are finger restraining portions 120 and post restraining portions 122; respectively.

These restraining portions 120 and 122 are constructed and spatially arranged for facilitating positioning behind and in overlying relationship to those portions of the latching finger 92 and the restraining post 98 which face away from the end walls 100. These restraining portions 120 and 122 are laterally spaced from the end wall 100 and respectively engage such opposing surfaces of the finger 92 and the restraining post 98 when the end wall is pulled in a direction at an angle to the plane of the finger and the end wall. By virtue of this hooking or overlying relationship coupled with movement with the end wall 100, the restraining portions 120 and 122 tend to continuously urge the latching portion 94 in continuous engagement with the ridge 114. Thus, advantageous means are provided for continuously maintaining the latching portion 96 in continuous engagement with the ridges 114. Accordingly, the latching fingers 92 are not disengaged by pulling or prying action on the end wall 100 and thus still allow the fingers 92 and the ridges 114 to operate so as to prevent pulling apart of the housing components 66 and 68. Moreover, the stem 118 is spaced from and adapted to engage the restraining post 98 to prevent the housing components 66 and 68 from being shifted apart in opposite horizontal directions as viewed in FIG. 5. For facilitating attachment of the housing components 66 and 68, the retaining portions 120 and 122 are constructed and spaced so that they may be positioned behind the finger 92 and the post 98 when the components are being assembled together. Such assembly takes place by pivoting the upper and lower components 66 and 68 together after the locking ledges 86 slidably cooperate with the hooking portions 106 in the manner shown in FIG. 5. To facilitate this pivoting type assembly as well as optimize spacing available for electric components, the latching fingers 92, the locking ridges 114 and the retaining members 116 are formed on and adjacent the forwardmost portion of the end wall 100.

According to the above arrangement, the flash housing 64 is tamper resistant to unassisted manual handling of the type wherein the end wall 100 and the ridge 114 are moved generally laterally or at an angle to the plane of the wall 100 and the latching finger 92 so as to have a tendancy to disengage latching portion 94. Advantageously, the improved flash housing 64 significantly diminishes the likelihood of a user opening the housing and being subjected to electrical shock by the electrically powered components. While this structural arrangement inhibits such separation, separation can nevertheless be effected by, for example, means of a suitable elongated tool (not shown). Separation could occur by allowing insertion of a thin tool through the recess 96 and into engagement with the latching portion 94 with enough force so as to independently flex the finger 92 and thereby overcome the inherent biasing force thereof and effect the desired disengagement. It should be appreciated that the latching portion 94 be spaced vertically sufficiently from the retaining member 116 to allow for the noted independent flexing of the finger 92.

From the foregoing detailed description, the construction and operation of the improved flash housing 64 of the present invention should be understood. Although the above description is in regard to a strobe housing, it is also to be understood that the spirit and scope of this invention embraces other types of housings.

Figure 8:
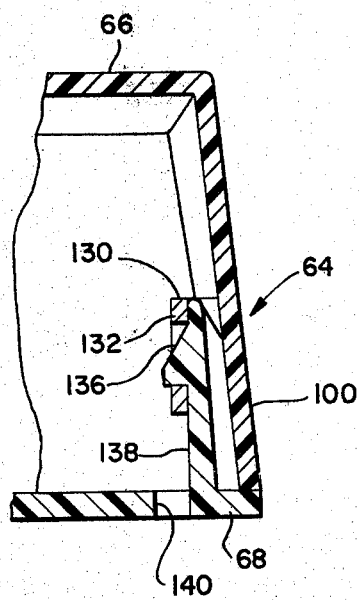
FIG. 8 is an enlarged fragmented cross-sectional view of the locking components depicted in FIG. 7 being shown in an assembled condition.

For reasons of economy, and particularly, to permit the use of more flexible wall material, the embodiment illustrated in FIGS. 4 and 8 would be preferable. In these figures, like structure will be indicated by like reference numerals. The aspects of this embodiment are more completely described and claimed in copending application Ser. No. 80,947, concurrently filed herewith; and commonly assigned with the present application. Briefly, in this embodiment, a flexible latching member 130 initially extends at an angle to the end wall 100 and then generally parallel thereto towards its terminating end. The distal end 132 of the latching member 130 has a rectangular opening 134 located so as to be in overlying relationship to a latching portion 136 of a latching wall member 138 when the sections are mated together. The latching member 130 cooperates with the latch 136 as shown in FIG. 8 for retaining the housing sections 66 and 68 together. An opening 140 is formed in the bottom wall 80 adjacent the latching portion 136 to allow insertion of a tool for effecting disengagement of such latching portion and the finger 130.

By reason of the foregoing relationship, the flexible latching member 130 will have a snap-fit engagement with the latching portion 136 when the housing sections 66 and 68 are forced together. It will be appreciated that the wall 100 cannot be pulled away from the housing section 68 because of the hooking type of engagement of the latching member 130 with the latching portion 136.

Thus, it will be appreciated that as a result of this invention, an improved housing is provided by which the above-mentioned objectives are completely fulfilled. Also, it will be apparent to those skilled in the art that modifications and/or changes may be made in the illustrated embodiment without departure from inventive concepts manifested thereby. Accordingly, it is expressly intended that the foregoing description is of a preferred embodiment only, not limiting, and that the true spirit and scope of the present invention be determined by reference to the appended claims.

What is claimed is:

1. In a housing for retaining electric and electronic elements of a photographic flash unit; said housing comprising mating first and second housing components; a first latching arrangement carried on the interior of an exterior wall of the first housing component; a second flexible latching arrangement carried by the second housing component and projecting therefrom in a manner and direction to engage and be flexed by said first tion of the electrical and electronic components of the strobe do not, per se, form an aspect of this invention, a detailed description thereof is not deemed necessary. However, for better understanding of this invention, a brief description of that structure will be presented. Included in the flash unit 12 are various strobe unit components (not shown), for example, a storage capacitor, adapted to be charged from the battery in the film pack and flash control circuits for regulating charging of the capacitor and controlling the application of the stored charge to the flash tube. In a preferred embodiment, flash unit 12 is of the quench type actuatable in time relation to camera shutter operation. During the film exposure phase, the photocell circuit of the camera 10 evaluates the reflected light level of the scene to be photographed. Accordingly, at a predetermined light level, consistent with exposure parameters, it provides a trigger signal that quenches the gaseous discharge light output of flash unit 12.

As best shown in FIGS. 3 to 6, the flash unit 12 includes a strobe or flash housing 64, preferably, made of molded plastic. The flash housing 64 includes matable upper and lower housing components or sections 66 and 68 having a plurality of generally planar wall sections.

While not necessary to the invention, the pivotal arrangement of the housing 64 will be briefly described. Included is a pair of pivotal mounting legs 70, each depending from an opposite side of the lower housing component 68. The mounting legs 70 are spaced apart for fitting over and cooperating with the mounting surfaces 42. In this regard, a mounting stub 72 (FIG. 4) is integrally molded on each of the legs 70 and has a snap-fit cooperation with a corresponding mounting hole (not shown) in the mounting section 42 for enabling the noted pivotal movement of the flash unit 12.

For releasably latching the flash unit 12 in both the erect and storage positions, there is provided latching means including a latching cam 73 and stop (not shown) associated with each of the mounting sections 42 and cooperates with cam follower and latch engaging structure (not shown) on each of the interior sides of the mounting legs 70. The flash unit 12 is releasably latched in its storage position (FIG. 2) for providing a compact configuration. In this regard, the flash housing 64 is configured and dimensioned to fit wholly within a storage zone Z. As so positioned, the flash unit 12 provides a protective enclosure for the optical elements on the housing section 18 including the taking lens 46, viewfinder lens 50, the photocell window (not shown) behind the aperture 52, and the ultrasonic transducer 56. Thus, when the flash unit 12 is folded in the manner indicated, it forms a protective enclosure for protecting the exposure control and flash systems from inadvertent damage. To unlatch the flash unit 12 for movement to the erect position (FIG. 1), the process is reversed. That is, the flash housing 64 is grasped by the user and moved upwardly to pivot it in a counterclockwise direction about the mounting posts 72. During such movement, the lower portion of legs 70 flex outwardly and ride over the latching elements (not shown) to assume an erect position wherein the legs return to their unstressed state.

For electrically coupling the various electrical and electronic components of flash unit 12 to the control circuitry of the camera 10, there is provided a multiple wire flex cable 74 best shown in FIG. 3. The cable 74 exits the housing section 18 and extends through a cable cover 76 (FIGS. 2 and 5). As best shown in FIG. 1, the cover 76 is adapted to fit into and conform generally to the depression 36.

As shown in FIG. 3, the lower housing compartment 68 includes forward wall 78 and, at right angles thereto, bottom wall 80. The forward wall 78 has a rectangular light aperture 82 allowing the light output of the flash tube (not shown) to pass outwardly through a light window 84 (FIG. 1). In the illustrated embodiment, the light output window 84 includes a plurality of vertically disposed prismatic lens elements for directing the light towards the field of view of the taking lens 46. This occurs, of course, when the flash unit 12 is erect. Extending along the rear edge of the bottom wall 80 is a pair of spaced apart locking ledges 86. Between the locking ledges 86, there is a space allowing passage of the flexible cable 74. Also, it will be observed in FIG. 5 that a protective wall 88 depends between each of the mounting legs 70 and forms part of the cable cover 76. Additionally, the mounting legs 70 depend from the bottom wall 80 for reasons indicated earlier. Extending upwardly from the bottom wall 80 is a biasing finger 90 for urging a flash tube housing (not shown) into correct positioning relative to the light window 84.

Turning once again to the latching arrangement of the present invention, it can be seen that along each end of the bottom wall 80 there extends upwardly an elongated latching arrangement finger 92 having a latching portion 94 adjacent its distal end. Adjacent each of the latching fingers 92 is formed a recess 96 (FIGS. 3-4) allowing insertion of a tool (not shown) for effecting disengagement of the latching finger 92 in a manner to be described. Located in juxtaposed relation to each of the latching fingers 92 is a restraining post 98 which is relatively short and rigid in comparison to the latching fingers 92.

The flash housing 64 is made of a suitable thermosetting or thermoplastic material which is relatively stiff, but capable of being flexed in a limited manner when subjected to sufficient flexing forces. Thus, the latching fingers 92 are movable from their initial non-flexed condition (FIG. 3) to a flexed locking condition (FIGS. 4-5). Additionally, this material serves to additionally electrically insulate the user from electric power. For purposes of illustration and not limitation the flash unit housing 64 is made from an ABS thermoplastic polymer having among other physical properties medium to high impact strength.

Now specifically referring to the upper housing component 66, it is seen to include a pair of opposite end walls 100 interconnected by adjoining pitched top wall 102 and back wall 104. A pair of spaced apart locking hook portions 106 (one of which is shown in FIGS. 3 and 5) is provided on the lower edge of the back wall 104. Each of the hook portions 106 is constructed to fit beneath and to cooperate with the locking ledges 86 (FIG. 5) for facilitating a tight fit between the matable housing components 66 and 68. A protective wall element 108 depends from the back wall 104 and cooperates with protective wall 88 to form the cable cover 76. Depending from the top wall 102 is a back stop 110 (FIGS. 4-5) for contacting the biasing finger 90.

Formed on the interior surface of each of the exterior end walls 100 is a latching arrangement including sloped camming surface 112 and detent ridge 114. These camming surfaces 112 are constructed and arranged to contact and flex the latching portions 94 during assembly. This engagement moves the fingers 94 from the initial unflexed condition (FIG. 3) to the flexed locking latching arrangement into a latched condition with said first latching arrangement when said housing components are mated to thereby prohibit separation of said housing components when said housing components are pulled in opposite directions in a given plane generally parallel to the plane of said wall, the improvement comprising:

retaining means extending from said wall in overlapping relationship to a surface of said second latching arrangement facing away from said wall so as to engage and retain said second latching arrangement in continuous engagement with said first latching arrangement when said wall is pulled in opposite directions relative to said first latching arrangement at an angle to said given plane.

2. The housing of claim 1 wherein said wall is an exterior wall of the assembled housing.

3. The housing of claim 2 wherein one of said latching arrangements includes an indent and the other of said latching arrangements includes a projection configured for latching engagement with said indent.

4. In a housing for retaining electric and electronic elements of a photographic flash unit comprising mating first and second housing components; a first latching arrangement carried on the interior of an exterior wall of the first housing component; a second flexible latching arrangement carried by the second housing component and projecting therefrom in a manner and direction to engage said first latching arrangement; said second latching arrangement including a portion constructed of material flexible relative to said first arrangement and arranged so that as said first and second housing components are forced together, said flexible portion is flexed from an unlocking position to a locking position to facilitate engagement between said latching arrangements and prohibit separation of the housing components when said housing components are pulled in opposite directions in a given plane generally parallel to the plane of said wall, the improvement comprising:

retaining means extending from said wall in overlapping relationship relative to a surface of said second latching arrangement facing away from said wall so as to engage and retain said second latching arrangement in continuous engagement with said first latching arrangement when said wall is pulled in an opposite direction relative to said first latching arrangement at an angle to said given plane.

5. The housing of claim 4 wherein said retaining means includes a member extending from said interior wall and being constructed and arranged to both extend behind said second latching arrangement and to move with said wall so as to engage and retain said flexible portion and thereby prevent flexing of said flexible portion to its unlocking position, said retaining member being constructed and arranged for allowing positioning thereof behind said second latching arrangement when said first and second housing components are being assembled together by general pivoting motion thereof.

6. The housing of claim 5 wherein said second latching arrangement is defined by an elongated and upstanding finger wherein said flexible portion is adjacent the distal end thereof for engagement with said first latching arrangement, and said retaining member engages said finger at a location sufficiently remote from said flexible portion so as to allow a tool to engage said flexible portion and independently move it out of engagement with said first latching portion.

7. The housing of claim 6 wherein one of the housing components is formed with an opening adjacent said flexible portion for allowing insertion of a suitable tool for effecting independent flexing of said second latching portion.

* * * * *